Patented Sept. 9, 1947

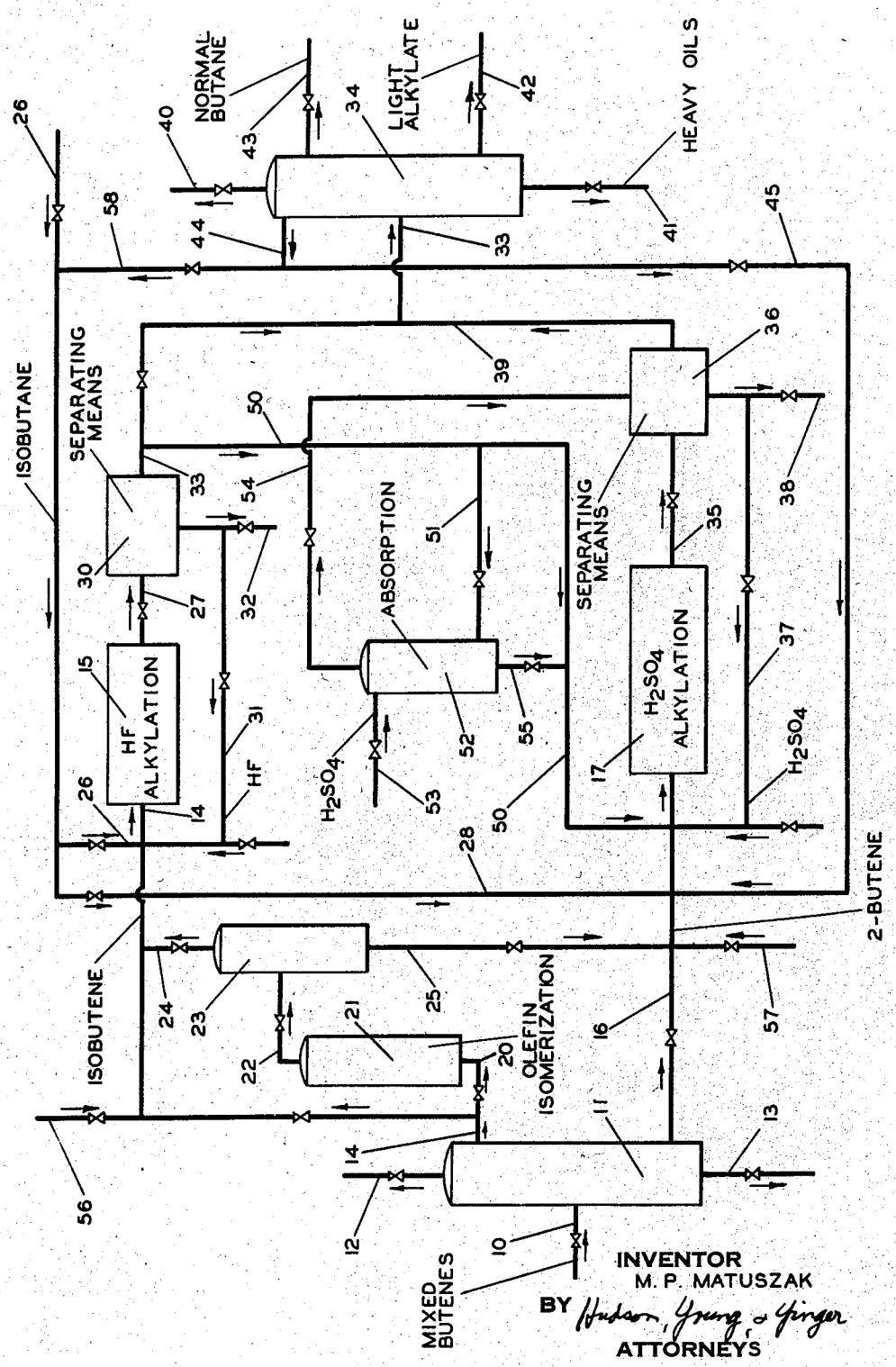

2,427,293

UNITED STATES PATENT OFFICE 2,427,293

ALKYLATION PROCESS

Maryan P. Matuszak, Bartlesville, Okla., assignor to Phillips Petroleum Company, a corporation of Delaware Application December 31, 1943, Serial No. 516,428

10 Claims. (Cl. 260—683.4)

This invention relates to alkylation of hydrocarbons. In one embodiment this invention relates to reacting isoparaffins with olefins in the presence of hydrofluoric acid as alkylation catalyst and to further reacting hydrocarbons effluent from said alkylation to produce a fluorine-free alkylate. In another embodiment this invention relates to alkylation of a low-boiling isoparaffin with olefins under conditions such that an alkylate of high octane number is produced from both tertiary-base and non-tertiary-base olefins. This application is a continuation-in-part of my copending application Serial No. 467,411, filed November 30, 1942, in which it is disclosed that I have found that, in the presence of concentrated hydrofluoric acid as catalyst, the octane ratings of the motor-fuel fractions of the alkylates obtained by alkylating isobutane with the tertiary base olefins or isoolefins are higher than the corresponding octane ratings for alkylates obtained from nontertiary base olefins, for example, normal or straight chain olefins, that the normal olefins are preferred in alkylation processes employing a catalyst other than hydrofluoric acid, for example, the sulfuric acid alkylation processes, and also in which I have disclosed and described a process comprising passing a mixture of olefins to separation means for separation of the isoolefin from the normal olefins or other nontertiary-base olefins, and passing the isoolefins from the separation means to an alkylator wherein an alkylation reaction with isobutane in the presence of a hydrofluoric acid catalyst occurs.

The reaction of an olefin with an isoparaffin to produce a higher-boiling paraffin is the basis for many important processes for the production of hydrocarbons which form important constituents of premium fuels for internal combustion engines. Many catalysts have been proposed for use in such processes, among them sulfuric acid and hydrofluoric acid. Both of these catalysts are employed under somewhat similar conditions when used with similar charge stocks. However, it is possible to use hydrofluoric acid at slightly higher reaction temperatures than are used with sulfuric acid, since destructive side reactions are generally relatively much less troublesome when hydrofluoric acid is the catalyst. I have found, however, that there is the following fundamental difference between these two catalysts: when hydrofluoric acid is used, the alkylate from reacting a tertiary-base olefin with an isoparaffin has a higher octane number than the alkylate from reacting a nontertiary-base olefin under the same conditions; whereas, when sulfuric acid is used, the alkylate from reacting a tertiary-base olefin with an isoparaffin does not have as high an octane number as the alkylate from reacting a nontertiary-base olefin under the same conditions. I have also found that under comparable alkylation conditions, when a tertiary-base olefin is reacted with an isoparaffin, the alkylate from hydrofluoric-acid-catalyzed alkylation is higher in octane rating than that from sulfuric acid-catalyzed alkylation; whereas, when a nontertiary-base olefin is reacted with an isoparaffin, the alkylate from sulfuric acid-catalyzed alkylation is higher in octane rating than that from hydrofluoric acid-catalyzed alkylation. Furthermore, when a mixture of tertiary-base and non-tertiary-base olefins is used as such, the alkylate produced has only a relatively inferior or at best an intermediate octane number. The theoretical reasons for these effects are not fully clear at present. I have further found that organic fluorine compounds present in minor proportion in the hydrocarbon effluent from hydrofluoric acid-catalyzed alkylation can be converted into higher-boiling hydrocarbons upon treatment with sulfuric acid. Although the organic fluorine generally does not exceed about 1 per cent of the total hydrocarbon material, and in many instances is less than about 0.1 per cent, it is desirable, even when the amount is less than 0.01 percent, to remove it from the alkylate. Most of this fluorine appears in the fraction of unreacted isoparaffins removable by distillation from the alkylation effluent.

It is an object of this invention to alkylate low-boiling isoparaffins with low-boiling olefins.

Another object of this invention is to produce an alkylate of high octane number from the olefins contained in a mixture of tertiary-base and nontertiary-base olefins.

It is a further object of this invention to take full advantage of the specific catalytic characteristics of hydrofluoric acid and of sulfuric acid as alkylation catalysts.

Further objects and advantages of this invention will become apparent, to one skilled in the art, from the accompanying disclosure and discussion.

In one specific embodiment of this invention isobutane is alkylated with isobutylene in the presence of hydrofluoric acid, the hydrocarbon phase is separated and freed from hydrofluoric acid and is subsequently subjected to alkylation with at least one normal butane in the presence of sulfuric acid, and the alkylate is isolated and withdrawn as a product of especially high yield and high octane number. In one modification of this embodiment the hydrocarbon phase from the first alkylation step is freed from hydrofluoric acid, the organic fluorine compounds are extracted from the hydrocarbon phase by concentrated sulfuric acid, and the sulfuric acid extract is used as a catalyst in a second alkylation step wherein an additional amount of isoparaffin is alkylated. In this modification it is particularly advantageous to react a tertiary-base olefin with an isoparaffin in the first alkylation step and to react a nontertiary-base olefin in the second alkylation step. In another embodiment of this invention a composite alkylate of especially high octane number is prepared from a mixture of olefins by a cooperative combination of steps comprising separating from the olefin mixture a fraction comprising tertiary-base olefins, that is substantially free from nontertiary-base olefins and also a fraction comprising nontertiary-base olefins, that is substantially free from tertiary-base olefins, alkylating a low-boiling isoparaffin with the first-mentioned olefin fraction in the presence of hydrofluoric acid as the catalyst, and separately alkylating a low-boiling isoparaffin with the second-mentioned olefin fraction in the presence of sulfuric acid as the alkylation catalyst.

Various embodiments of this invention will now be discussed with reference to the accompanying drawing, which forms a part of this specification and which is a diagrammatic flow sheet. For the sake of simplicity, the discussion will be specifically to reacting isobutylene and normal butenes with isobutane, although it is to be understood that the invention is not necessarily limited to these specific hydrocarbons, which are preferred reactants, since the invention may be applied generally to reacting low-boiling olefins with low-boiling isoparaffins, especially olefins and isoparaffins having four to six carbon atoms per molecule.

In one embodiment of this invention, an olefin-containing four-carbon hydrocarbon mixture, such as is commonly available in a refinery in which cracking processes are conducted, is passed through line 10 to separating means illustrated by fractionating column 11. Any undesired lower-boiling hydrocarbons may be removed by fractional distillation and may be discharged through line 12, and any undesired higher-boiling hydrocarbons may be removed and discharged through line 13. Fractionating means 11 is operated so as to produce a fraction containing isobutylene that is substantially free from normal butenes and a fraction containing normal butenes that is substantially free from isobutylene. When the charge introduced through line 10 contains only a minor proportion of 1-butene, such a separation can be satisfactorily effected by fractional distillation. The resultant isobutylene fraction is passed through line 14 to alkylator 15, wherein concentrated hydrofluoric acid is used as the alkylation catalyst, and the normal-butene fraction is passed through line 16 to alkylator 17, wherein concentrated sulfuric acid is used as the alkylation catalyst. However, when the charge in line 10 contains a substantial proportion of 1-butene, fractional distillation alone is inadequate, since the lower-boiling fraction will contain 1-butene as well as isobutylene; whereupon these two olefins are preferably separated by passing this fraction from line 14 through line 20 to an olefin-isomerization step carried out in isomerizer 21, wherein 1-butene is converted to 2-butenes. The effluent from this isomerization step is passed through line 22 to separating means illustrated by fractional-distillation column 23. From separation means 23 an isobutylene fraction is passed through line 24 to reactor 15, and a normal-butene fraction is passed through line 25 to reactor 17.

Other means can be employed to effect a satisfactory separation of isobutylene from normal butenes. For example, the charge passing through line 10 may be preliminarily subjected to selective polymerization, whereby substantially only the isobutylene is polymerized, leaving the normal butenes unreacted. A normal-butene fraction substantially free from isobutylene can be readily separated from the polymerization effluent, and the polymer can be subjected to depolymerization to form isobutylene, which can be recovered substantially free from normal butenes. A similar procedure can be applied to the material passing through line 20. However, separation by isomerization of the 1-butene is preferred as being most advantageous because of its relative simplicity, economy, and efficacy.

In alkylator 15 the isobutylene is reacted with isobutane in the presence of liquid hydrofluoric acid as alkylation catalyst. When isobutane is present in the charge introduced through line 10, the isobutylene fraction passed through line 14 contains substantially all of this isobutane. Additional isobutane can be charged from a suitable outside source to the system through line 26. The effluent from alkylator 15 is passed through line 27 to separating means 30, wherein it is separated into a liquid hydrofluoric acid phase and a liquid hydrocarbon phase. The hydrofluoric acid phase is recycled through line 31 back to alkylator 15; ordinarily a part of it is passed through line 32 to purification or regeneration means not shown. The hydrocarbon phase is freed from hydrofluoric acid, preferably by distillation as a low-boiling mixture with isobutane, and is then passed from separating means 30 through line 33 to further separating means, illustrated by fractional-distillation column 34.

Simultaneously with the alkylation in alkylator 15, the normal butenes are reacted with isobutane in alkylator 17 in the presence of concentrated sulfuric acid as alkylation catalyst. It it generally necessary to add isobutane from an outside source for this alkylation, as through lines 26 and 28. The effluent from alkylator 17 is passed through line 35 to separating means 36, wherein it is separated into a sulfuric acid phase and a hydrocarbon phase. The sulfuric acid phase is ordinarily recycled at least in part through line 37 to the alkylator 17, and may be discharged in part through line 38. The hydrocarbon phase is freed from traces of acidic materials, as by an alkaline wash, and is then passed through line 39 to separating means 34.

In separating means 34, the effluents from the two alkylation steps are treated as a single hydrocarbon mixture to effect separation into several fractions. Undesired low-boiling material is removed through line 40, and undesired high-boiling material is removed through line 41. A light-alkylate fraction is removed as a product of the process through line 42; it consists of paraffins boiling within the gasoline range that were formed in both of the alkylations, and it has a higher octane number than that of a corresponding product from reaction of the mixed olefins charged through line 10 with isobutane under alkylation conditions while still mixed together.

Any normal butane which may be present can be discharged through line 43. An isobutane fraction is removed through line 44 and is preferably passed through line 45 to alkylator 17; it contains a major part of the organic fluorine compounds that pass from separating means 30 through line 33.

In a modification of this invention, the hydrocarbon material from separating means 30 is passed from line 33 through line 50 directly to alkylator 17. In consequence, the organic fluorine compounds are subjected to reaction in the presence of sulfuric acid as catalyst to produce additional hydrocarbons boiling in the gasoline range, concomitantly with the alkylation taking place between normal butenes and isobutane. As will be appreciated by one skilled in the art, the hydrocarbon material passing through line 50 contains a large proportion of unreacted isobutane; however, since it is generally desirable to maintain the ratio of unreacted isobutane to alkylate quite high during alkylation, it will generally be desirable to add additional isobutane through line 28.

In a further modification of this invention, the hydrocarbon material is passed from line 50 through line 51 to absorption means 52, wherein it is contacted with concentrated sulfuric acid charged to the system through line 53. This sulfuric acid extracts from the hydrocarbon material organic fluorine compounds. The extracted hydrocarbon material then passes from absorption means 52 through line 54 to separating means 36, and after purification therein it is passed through lines 39 and 33 to separating means 34. The sulfuric acid, containing absorbed organic fluorine compounds, is passed from absorption means 52 through line 55 to alkylator 17, wherein it is used as alkylation catalyst.

In either of these two modifications, the unreacted isobutane, passed through line 44, is substantially free from fluorine compounds and may, if desired, be returned to alkylator 15 through line 58.

My invention will generally be applied to an olefin-containing charge stock which contains both isobutylene and normal butenes such as has been described in connection with the charge through line 10. However, it will be realized that many of the advantages discussed herein can be obtained when charging stocks are available containing only isobutylene as the olefin and only one or more normal butenes as the olefin. Such charge stocks can be passed to the system through lines 56 and 57, respectively.

The alkylation conditions which are to be used in alkylator 15 and in alkylator 17 will not be different from those disclosed in the art in connection with the use of catalysts discussed. The alkylation in alkylator 15 will generally be under a pressure such that the materials will be present as liquids, with a high ratio of isoparaffin to olefin, with a ratio of catalyst to hydrocarbon between about 0.5:1 and 3:1, and a reaction temperature between about 50 and about 125° F. The conditions in alkylator 17 will be much the same except that the reaction temperature should generally be lower, such as between about 35 and about 70° F. The olefin isomerization conducted in isomerizer 21 can be carried out in any manner known to the art. I have found that particularly advantageous results are obtained by contacting the olefin material with a chromium oxide catalyst at a temperature between about 300 and about 750° F. for a time such that there is no appreciable dehydrogenation of olefin material. The sulfuric acid extraction conducted in absorption means 52 is conducted at a temperature between about 35 and about 100° F., with a volume ratio of acid to hydrocarbon between about 0.5:1 and 3:1, and with intimate contact between acid and hydrocarbon. It will be readily appreciated that in the practice of any specific embodiment of my invention various conventional pieces of equipment are used, such as pumps, compressors, heaters, coolers, contactors, separators, fractional distillation columns, and the like which can be readily designed and supplied by one skilled in the art in the light of the present discussion.

My invention is further illustrated by the following examples, which should not be so construed as to limit the invention unduly.

*Example I*

A refinery fraction containing approximately equimolecular proportions of isobutylene and of each of the normal butenes is fractionally distilled to separate 2-butene as a kettle fraction. The overhead fraction is subjected to isomerization by a catalyst, preferably a catalyst comprising chiefly one or more oxides of the group of metals consisting of aluminum, beryllium, chromium, and magnesium, further preferably black chromium oxide, to isomerize about three fourths of the 1-butene to 2-butene. The isomerization effluent is fractionally distilled to separate the 2-butene from the isobutylene and unisomerized 1-butene. The isobutylene fraction, which now contains only a relatively minor proportion of 1-butene, may be passed to a hydrofluoric acid alkylation step, but it usually is preferably first subjected to a second stage of isomerization and fractional distillation, whereby the content of 1-butene is further decreased. The isobutylene fraction is then used for the alkylation of isobutane in the presence of hydrofluoric acid under alkylation conditions, and the composite of 2-butene fractions is similarly used in a step for the alkylation of isobutane in the presence of sulfuric acid under separate suitable alkylation conditions. The alkylation effluents are separated into hydrocarbon and catalyst phases in separate settling tanks. The hydrocarbon phase from the hydrofluoric acid alkylation is freed from dissolved hydrofluoric acid by distillation of the acid as a low-boiling mixture with isobutane, which is recycled to the alkylation step; it is freed from organic fluorine by contact under defluorination conditions with granular bauxite or similar defluorinating contact material. The hydrocarbon phase from the sulfuric acid alkylation is freed from traces of acidic materials by washing with an alkali. The thus purified hydrocarbon phases are combined and are subjected to fractional distillation to isolate the motor-fuel fraction, which is obtained in exceptionally high yield and is of exceptionally high octane rating, being notably superior in these respects to the product obtained by use of the original mixture of butylenes as such for alkylation of isobutane in the presence of either hydrofluoric acid or sulfuric acid. The exact magnitude of the advantage of this invention with respect to yield and octane rating depends somewhat on the exact composition of the original mixture of butenes and on the extent of isomerization of 1-butene to 2-butene, but generally the yield is greater by several per cent, and the octane number of the motor-fuel product is greater by about 2 A. S. T. M. octane number units.

The following typical numerical data for continuous pilot-plane catalytic alkylation of isobutane with various butenes illustrate suitable alkylating conditions, and also demonstrate that optimum yields and octane ratings are obtained when isobutylene is used with hydrofluoric acid as the catalyst and when normal butenes are used with sulfuric acid as the catalyst, whereas mixtures of isobutylene and normal butenes yield relatively inferior results with either catalyst.

| Catalyst | HF | HF | HF | HF | H₂SO₄ | H₂SO₄ | H₂SO₄ | H₂SO₄ | H₂SO₄ |
|---|---|---|---|---|---|---|---|---|---|
| Reactants, weight per cent: | | | | | | | | | |
| Isobutylene | 7.9 | 0 | 0 | 9.4 | 0 | 0 | | 9.1 | 12.0 |
| 1-Butene | 0 | 0 | 9.7 | 7.1 | | 0 | 16.5 | 0 | 0 |
| 2-Butene | 0 | 9.6 | 0 | 0 | 8.7 | 16.2 | 0 | 0 | 0 |
| Isobutane | 82.9 | 90.4 | 90.1 | 83.5 | 68.6 | 83.8 | 83.5 | 90.9 | 88.0 |
| N-butane | 0 | 0 | 0.2 | 0 | 21.4 | 0 | 0 | 0 | 0 |
| Heavier | 0 | 0 | 0 | 0 | 1.3 | 0 | 0 | 0 | 0 |
| Isobutane/butylene (mol.) | 10.5 | 9.0 | 9.1 | 4.9 | 7.6 | 5.0 | 4.9 | 9.6 | 7.1 |
| Acid/HC (vol.) | 0.77 | 0.67 | 0.77 | 0.62 | 1 | 0.7 | 1 | 0.9 | 0.7 |
| Temp., °F | 82 | 114 | 116 | 116 | 50 | 50 | 50 | 50 | 68 |
| Time, min | 14.5 | 9.2 | 11.6 | 7.0 | 23 | 20 | 25 | 25 | 10 |
| Total alkylate: | | | | | | | | | |
| Yield, weight per cent of butene | 201 | 196 | 200 | 185 | 194 | 200 | 195 | 184 | 180 |
| Composition, volume per cent: | | | | | | | | | |
| Boiling 203° F | 8.2 | 13.9 | 13.0 | 12.4 | 10 | 11 | 12 | 13 | 19 |
| Boiling 203–260° F | 86.5 | 77.8 | 76.2 | 73.5 | 85 | 81 | 79 | 73 | 63 |
| Boiling 260° F | 5.3 | 8.3 | 10.8 | 14.1 | 5 | 8 | 9 | 14 | 18 |
| Light alkylate: | | | | | | | | | |
| Cut point, °F | 365 | 378 | 388 | 365 | 302 | 302 | 350 | 357 | 302 |
| Yield, volume per cent | 99.1 | 96.3 | 98.2 | 96.1 | 95.8 | 93 | 96 | 90 | 81 |
| Octane No. (ASTM) | 95.6 | 92.8 | 89.2 | 90.6 | 94.0 | 94.0 | 92.5 | 90.5 | 91.5 |

*Example II*

Isobutane is alkylated with an isobutylene fraction under economically favorable conditions in the presence of hydrofluoric acid in a first alkylation step. The alkylation reaction mixture is separated into hydrocarbon and catalyst liquid phases, and the hydrocarbon phase is freed from dissolved hydrofluoric acid by azeotropic distillation. The hydrocarbon phase is then passed to a second alkylation step, in which it is again subjected to alkylation under economically favorable conditions, this time with a normal-butene fraction and in the presence of concentrated sulfuric acid; additional isobutane may be advantageously introduced into this second alkylation step to maintain favorable ratios of isobutane to incoming olefin and of isobutane to alkylate. The alkylation reaction mixture is separated into hydrocarbon and catalyst liquid phases, and the hydrocarbon phase is passed to a fractionator in which it is separated into desired fractions, comprising, (1) unreacted isobutane, which is recycled, together with a minor proportion of hydrofluoric acid, to the second alkylation step, (2) normal butane, which is removed from the process for dehydrogenation, if desired, to normal butylenes that may be fed to the second alkylation step, (3) motor fuel, which is withdrawn as a product of high yield and quality, and (4) a heavier fraction which is withdrawn as a by-product.

Since this invention may be practiced otherwise than as specifically described, and since many variations or modifications of it will be obvious to the skilled in the art, it should be limited only in accordance with the appended claims.

I claim:

1. An improved process for producing low-boiling normally liquid paraffin hydrocarbons from a mixture comprising isobutene and a normal butene, which comprises separating from such a mixture a fraction comprising isobutene and substantially free from normal butenes and a fraction comprising a normal butene and substantially free from isobutene, reacting said isobutene fraction with isobutane under alkylation reaction conditions and in the presence of concentrated hydrofluoric acid as the alkylation catalyst, separating a hydrocarbon phase from effluents of said alkylation containing unreacted isobutane, products of said alkylation and a minor amount of organic fluorine compounds produced during and incidental to said alkylation, reacting said hydrocarbon phase with said normal butene fraction under alkylation reaction conditions and in the presence of concentrated sulfuric acid as the alkylation catalyst, and recovering from effluents of the last said reaction a low-boiling, normally liquid, paraffinic hydrocarbon fraction containing paraffin hydrocarbons produced in each said alkylation reaction.

2. An improved process for producing low-boiling normally liquid paraffin hydrocarbons from a mixture comprising isobutene and a normal butene, which comprises separating from such a mixture a fraction comprising isobutene and substantially free from normal butenes and a fraction comprising a normal butene and substantially free from isobutene, reacting said isobutene fraction with isobutane under alkylation reaction conditions and in the presence of concentrated hydrofluoric acid as the alkylation catalyst, separating a hydrocarbon phase from effluents of said alkylation, reacting said normal butene fraction with isobutane under alkylation reaction conditions and in the presence of concentrated sulfuric acid as the alkylation catalyst, separating a hydrocarbon phase from effluents of said alkylation, combining the two said hydrocarbon phases and fractionallly distilling the resultant mixture in a common fractional distillation system, removing from said distillation system as a product of the process a low-boiling normally liquid paraffinic hydrocarbon fraction containing paraffin hydrocarbons produced in both said alkylations, removing also from said distillation system a fraction comprising unreacted isobutane, and containing a minor amount of organic fluorine compounds formed during and incidental to the first said alkylation, and passing said fraction solely to the second said alkylation.

3. An improved process for producing low-boiling normally liquid paraffin hydrocarbons from a mixture comprising isobutene and a normal butene, which comprises separating from such a mixture a fraction comprising isobutene and substantially free from normal butenes and a fraction comprising a normal butene and substantially free from isobutene, reacting said isobutene fraction with isobutane under alkylation reaction conditions and in the presence of concentrated hydrofluoric acid as the alkylation catalyst, separating from effluents of said alkylation a fraction comprising unreacted isobutane and a minor amount of organic fluorine compounds produced during and incidental to said alkylation, and reacting said isobutane fraction and the aforesaid normal butene fraction under alkylation reaction conditions and in the presence of concentrated sulfuric acid as the alkylation catalyst, and recovering from effluents of each said reaction higher-boiling paraffins so produced.

4. An alkylation process which comprises reacting a low-boiling isoparaffin and a low-boiling tertiary-base olefin under alkylation reaction conditions and in the presence of concentrated hydrofluoric acid as the alkylation catalyst to produce higher-boiling paraffin hydrocarbons, separating from effluents of said reaction a fraction comprising unreacted low-boiling isoparaffin and a minor amount of organic fluorine compounds produced during and incidental to said reaction, and reacting said fraction with a low-boiling nontertiary-base olefin under alkylation reaction conditions and in the presence of concentrated sulfuric acid as the alkylation catalyst to produce higher-boiling paraffin hydrocarbons and remove organic fluorine compounds, and recovering from effluents of each said reaction higher-boiling paraffins so produced.

5. The process of claim 4 in which said isoparaffin is isobutane, said tertiary-base olefin is isobutene, and said normal olefin is a normal butene.

6. A process for producing low-boiling normally liquid paraffin hydrocarbons from a mixture comprising a low-boiling tertiary-base olefin and a low-boiling non-tertiary-base olefin, which comprises separating from such a mixture a fraction comprising a low-boiling tertiary-base olefin and substantially free from non-tertiary-base olefins and a fraction comprising a non-tertiary-base olefin and substantially free from tertiary-base olefins, reacting said tertiary-base olefin fraction with a low-boiling isoparaffin under alkylation reaction conditions and in the presence of concentrated hydrofluoric acid as the alkylation catalyst, separating a hydrocarbon phase from effluents of said alkylation, reacting said non-tertiary-base olefin fraction with a low-boiling isoparaffin under alkylation reaction conditions and in the presence of concentrated sulfuric acid as the alkylation catalyst, separating a hydrocarbon phase from effluents of said alkylation, combining the two said hydrocarbon phases and fractionally distilling the resultant mixture in a common fractional distillation system, removing from said distillation system as a product of the process a low-boiling normally liquid paraffinic hydrocarbon fraction containing paraffin hydrocarbons produced in both said alkylations, removing also from said distillation system a fraction comprising unreacted low-boiling isoparaffin, and containing a minor amount of organic fluorine compounds formed during and incidental to the first said alkylation, and passing said fraction solely to the second said alkylation.

7. An improved process for producing low-boiling normally liquid paraffin hydrocarbons from a mixture comprising isobutene and a normal butene, which comprises separating from such a mixture a fraction comprising isobutene and substantially free from normal butenes and a fraction comprising a normal butene and substantially free from isobutene, reacting said isobutene fraction with isobutane under alkylation reaction conditions and in the presence of concentrated hydrofluoric acid as the alkylation catalyst, separating a hydrocarbon phase from effluents of said alkylation, passing said hydrocarbon phase to an absorption means and contacting same with concentrated sulfuric acid to absorb organic fluorine compounds, separating from said absorption means a hydrocarbon phase and a sulfuric acid extract, reacting said normal butene fraction with isobutane under alkylation reaction conditions and in the presence of a concentrated sulfuric acid alkylation catalyst comprising said sulfuric acid extract, separating a hydrocarbon phase from effluents of said last-mentioned alkylation, combining the last said hydrocarbon phase and the hydrocarbon phase from said absorption means and separating from the resultant mixture as a product of the process a low-boiling normally liquid paraffinic hydrocarbon fraction containing paraffin hydrocarbons produced in both said alkylations.

8. An alkylation process which comprises reacting a low-boiling isoparaffin and a low-boiling tertiary-base olefin under alkylation reaction conditions and in the presence of concentrated hydrofluoric acid as the alkylation catalyst to produce higher-boiling paraffin hydrocarbons, separating a first hydrocarbon phase from effluents of said alkylation, passing said hydrocarbon phase to an absorption means and contacting same with concentrated sulfuric acid to extract therefrom organic fluorine compounds contained therein, separating from said absorption means a second hydrocarbon phase and a sulfuric acid extract phase, reacting a low-boiling isoparaffin and a low-boiling non-tertiary-base olefin under alkylation conditions in the presence of a concentrated sulfuric acid alkylation catalyst comprising the aforesaid sulfuric acid extract phase as the alkylation catalyst to produce higher-boiling paraffin hydrocarbons, separating a third hydrocarbon phase from effluents of said last-mentioned alkylation, and separating from said second and third hydrocarbon phases normally liquid paraffinic hydrocarbons of motor fuel boiling range so produced.

9. The process of claim 1 wherein said last-named reaction is conducted at a temperature of from 35 to 70° F.

10. The process of claim 7 wherein said step of contacting said hydrocarbon phase with concentrated sulfuric acid to absorb organic fluorine compounds is conducted at a temperature of from 35 to 100° F. with a volume ratio of acid to hydrocarbon between about 0.5:1 and 3:1.

MARYAN P. MATUSZAK.

REFERENCES CITED

The following references are of record in the file of this patent:

UNITED STATES PATENTS

| Number | Name | Date |
|---|---|---|
| 2,267,730 | Grosse et al. | Dec. 30, 1941 |
| 2,335,507 | Grosse et al. | Nov. 30, 1943 |
| 2,327,926 | Oakley et al. | Aug. 24, 1943 |
| 2,348,017 | Miller | May 2, 1944 |
| 2,373,101 | Clarke | Apr. 10, 1945 |
| 2,330,206 | Dryer et al. | Sept. 28, 1943 |